(12) United States Patent
Singh (10) Patent No.: US 9,338,070 B2
(45) Date of Patent: May 10, 2016

(54) SYSTEM AND METHOD FOR OPERATING M2M DEVICES

(71) Applicant: Industrial Technology Research Institute, Chutung, Hsinchu (TW)

(72) Inventor: Shubhranshu Singh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 233 days.

(21) Appl. No.: 13/973,919

(22) Filed: Aug. 22, 2013

(65) Prior Publication Data

US 2014/0129672 A1    May 8, 2014

Related U.S. Application Data

(60) Provisional application No. 61/721,786, filed on Nov. 2, 2012.

(51) Int. Cl.
| | |
|---|---|
| G06F 15/16 | (2006.01) |
| G06F 11/00 | (2006.01) |
| H04L 12/26 | (2006.01) |
| H04W 72/04 | (2009.01) |

(52) U.S. Cl.
CPC ........... *H04L 43/08* (2013.01); *H04W 72/0446* (2013.01)

(58) Field of Classification Search
USPC .......................................... 709/217; 370/216
See application file for complete search history.

(56) References Cited

U.S. PATENT DOCUMENTS

| | | | |
|---|---|---|---|
| 8,437,285 B2 | 5/2013 | Jokimies et al. | |
| 9,036,532 B2 * | 5/2015 | Lim et al. | 370/312 |
| 2010/0118815 A1 * | 5/2010 | Kim et al. | 370/329 |
| 2010/0278065 A1 * | 11/2010 | Sun et al. | 370/252 |
| 2011/0038290 A1 * | 2/2011 | Gong et al. | 370/311 |
| 2011/0191826 A1 * | 8/2011 | Ballal et al. | 726/4 |
| 2011/0243047 A1 * | 10/2011 | Dayal et al. | 370/311 |
| 2012/0033613 A1 | 2/2012 | Lin et al. | |
| 2012/0231828 A1 * | 9/2012 | Wang et al. | 455/509 |
| 2012/0329485 A1 | 12/2012 | Lee et al. | |
| 2013/0003629 A1 | 1/2013 | Jeong et al. | |

FOREIGN PATENT DOCUMENTS

| | | |
|---|---|---|
| CA | 2 795 258 | 10/2011 |
| CN | 101690348 | 3/2010 |
| CN | 102655668 | 9/2012 |

(Continued)

OTHER PUBLICATIONS

Fowler, "Study on Power Saving Based on Radio Frame in LTE Wireless Communication System Using DRX", 2011, IEEE Globecom Workshop on Workshop of SCPA and SaCoNAS, six (6) pages total.

(Continued)

*Primary Examiner* — Peling Shaw
(74) *Attorney, Agent, or Firm* — Finnegan, Henderson, Farabow, Garrett & Dunner LLP (57) ABSTRACT

A method for operating machine-to-machine devices in a network includes: monitoring a traffic condition of a communication network; determining, based on a result of monitoring the traffic condition, an allowed time duration for a group of machine-to-machine devices to communicate with a machine-to-machine server through the communication network; and transmitting information indicating the allowed time duration to a machine-to-machine gateway for operating the machine-to-machine devices according to the allowed time duration.

39 Claims, 6 Drawing Sheets

(56) References Cited

FOREIGN PATENT DOCUMENTS

| CN | 102917444 | 2/2013 |
|----|-----------|--------|
| GB | 2483752 | 3/2012 |
| KR | 10-2011-0000147 | 1/2011 |
| WO | WO 2008/094681 A1 | 8/2008 |
| WO | WO 2009/114800 A2 | 9/2009 |

OTHER PUBLICATIONS

Fowler et al. "Analysis of Adjustable and Fixed DRX Mechanism for Power Saving in LTE/LTE-Advanced", In proceeding of IEEE International Conference on Communications (Jan. 2012), 7 pages total.

Samsung, "Randomized Time Control", 3GPP TSG SA WG2 Meeting #78, Feb. 22-26, 2010, San Francisco, USA, pp. 1-6.

3GPP TS 36.331. $3^{rd}$ Generation Partnership Project; Technical Specification Group Radio Access Network; Evolved Universal Terrestrial Radio Access (E-UTRA) Radio Resource Control (RRC); Protocol specification (Release 8). 3GPP TS 36.331 V8.5.0 (Mar. 2009); pp. 1-204.

Bontu at al., "DRX Mechanism for Power Saving in LTE", IEEE Communications Magazine, Jun. 2009, pp. 48-55.

Ericsson, St-Ericsson, "Proactive Congestion Control for Low Priority MTC Traffic", 3GPP TSG SA WG2 Meeting #79, May 10-14, 2010, Kyoto, Japan, pp. 1-5.

\* cited by examiner

SYSTEM AND METHOD FOR OPERATING M2M DEVICES

RELATED APPLICATIONS

This application is based upon and claims the benefit of U.S. Provisional Patent Application No. 61/721,786, filed Nov. 2, 2012, the entire contents of which are incorporated herein by reference.

TECHNICAL FIELD

This disclosure relates to machine-to-machine (M2M) devices in a communication system.

BACKGROUND

A machine-to-machine (M2M) system, also known as a machine-type-communication (MTC) system, is a communication system that enables a flow of data, e.g., monitored data, from machine to machine and/or from machine to human with minimal human interactions. Examples of the M2M system include security systems, surveillance systems, smart meter systems, etc.

A conventional M2M system includes one or more M2M devices, an M2M server, and a wireless network provided by a service provider that may cover a large number of M2M devices. The M2M devices may be used in different applications including, e.g., electricity, water, or gas consumption monitoring, remote health monitoring, inventory applications, etc. The M2M devices are configured to send monitored data through the wireless network to the M2M server for further processing or analysis. The wireless network connecting the M2M devices and the M2M server operates in accordance with a communication standard, such as the Long-Term Evolution (LTE) standard developed by the 3rd Generation Partnership Project (3GPP).

Communications between the M2M devices and the M2M server may generate significant network traffic for the wireless network. In addition, the M2M devices are often small and power-constrained. In many cases, the service life of these devices varies from several months to years and depends on how efficiently they utilize their internal energy source (e.g., batteries).

SUMMARY

According to one embodiment, a method for operating machine-to-machine devices in a network is provided, the method comprising: monitoring a traffic condition of a communication network; determining, based on a result of monitoring the traffic condition, an allowed time duration for a group of machine-to-machine devices to communicate with a machine-to-machine server through the communication network; and transmitting information indicating the allowed time duration to a machine-to-machine gateway for operating the machine-to-machine devices according to the allowed time duration.

According to another embodiment, a system for operating machine-to-machine devices in a network is provided, the system comprising: a first processor configured to monitor a traffic condition of a communication network and determining, based on a result of monitoring the traffic condition, an allowed time duration for a group of machine-to-machine devices to communicate with a machine-to-machine server through the communication network; and a second processor configured to transmit information indicating the allowed time duration to a machine-to-machine gateway for operating the machine-to-machine devices according to the allowed duration.

According to another embodiment, a method for operating machine-to-machine devices in a network is provided, the method comprising: receiving information indicating an allowed time duration for a group of machine-to-machine devices to communicate with a machine-to-machine server through a communication network; determining communication windows for the machine-to-machine devices, respectively, based on the allowed time duration; and transmitting data indicating the respective communication windows to the respective machine-to-machine devices for operating the machine-to-machine devices according to the respective communication windows.

According to another embodiment, an apparatus for operating machine-to-machine devices in a network is provided, the apparatus comprising: a first interface module configured to receive information indicating an allowed time duration for a group of machine-to-machine devices to communicate with a machine-to-machine server through a communication network; a controller configured to determine communication windows for the individual machine-to-machine devices based on the allowed time duration; and a second interface module configured to transmit data indicating the communication windows to the machine-to-machine devices for operating the machine-to-machine devices according to the respective communication windows.

According to another embodiment, a computer-readable medium is provided, including instructions, which, when executed by a processor, cause the processor to perform a method for operating machine-to-machine devices in a network. The method comprises: receiving information indicating an allowed time duration for a group of machine-to-machine devices to communicate with a machine-to-machine server through a communication network; determining communication windows for the respective machine-to-machine devices based on the allowed time duration; and transmitting data indicating the respective communication windows to the respective machine-to-machine devices for operating the machine-to-machine devices according to the respective communication windows.

According to another embodiment, a method for operating a machine-to-machine device is provided, the method comprising: receiving information indicating an allowed time duration for a group of machine-to-machine devices to communicate with a machine-to-machine server through a communication network, the machine-to-machine devices capable of operating in an active mode and a power-saving mode; determining parameters for the active mode and the power-saving mode for at least one of the machine-to-machine devices; and transmitting data for operating the at least one machine-to-machine device of the group of machine-to-machine devices according to the parameters.

According to another embodiment, a method for operating a machine-to-machine device is provided, the method comprising: receiving parameters of an active mode and a power-saving mode of a machine-to-machine device; and switching the machine-to-machine device between the active mode and the power-saving mode according to the parameters, the machine-to-machine device, when operating in the active mode, communicating with a machine-to-machine server through a communication network.

According to another embodiment, an apparatus is provided, comprising: a receiver and a transmitter, the receiver being configured to receive parameters of an active mode and a power-saving mode of the apparatus; and a controller configured to switch the apparatus between the active mode and the power-saving mode according to the parameters and activate the receiver and the transmitter in the active mode to communicate with a machine-to-machine server through a communication network.

According to another embodiment, a computer-readable medium is provided, including instructions, which, when executed by a processor, cause the processor to perform a method for operating a machine-to-machine device. The method comprises: receiving parameters of an active mode and a power-saving mode of a machine-to-machine device; and switching the machine-to-machine device between the active mode and the power-saving mode according to the parameters, the machine-to-machine device, when operating in the active mode, communicating with a machine-to-machine server through a communication network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
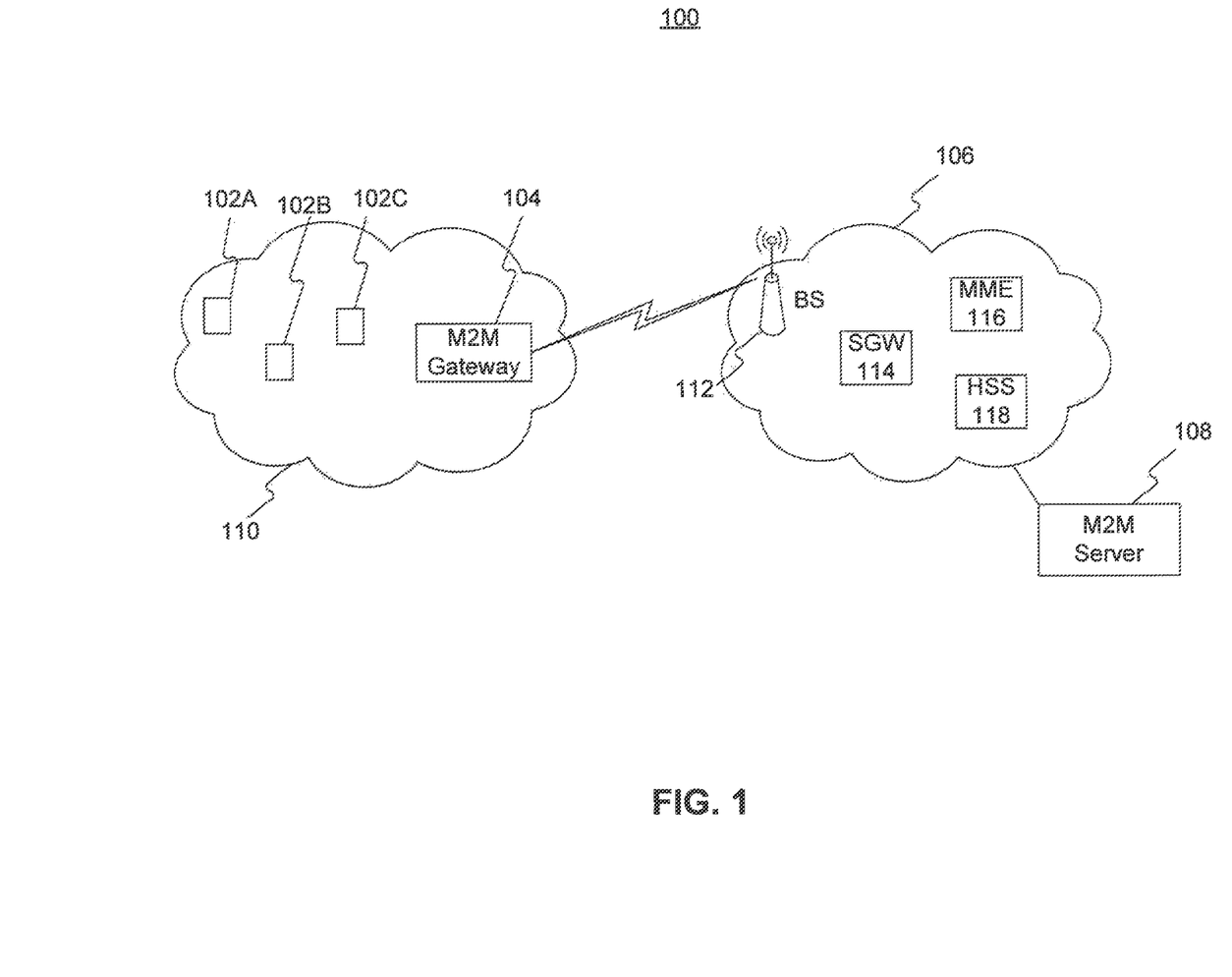
FIG. 1 illustrates a block diagram of a system of an M2M deployment, according to an exemplary embodiment.

FIG. 1 illustrates a block diagram of a system 100 of a machine-to-machine deployment, according to an exemplary embodiment. Referring to FIG. 1, the system 100 includes one or more M2M devices 102A-102C, an M2M gateway 104, a communication network 106, and at least one M2M server 108.

The M2M devices 102A-102C may each be a monitoring device for monitoring and sending data to the M2M server 108 for further processing or analysis. The M2M devices 102A-102C may be used in different applications including, e.g., electricity, water, or gas consumption monitoring, remote health monitoring, inventory applications, etc. In addition, the M2M devices 102A-102C may be grouped as one or more groups of M2M devices based on common features, locations, etc.

According to a further embodiment, the M2M devices 102A-102C are configured to switch between an active mode and a power-saving mode. In the active mode, each of the M2M devices 102A-102C is configured to communicate with the M2M server 108 by transmitting and receiving data therefrom. In the power-saving mode, each of the M2M devices 102A-102C does not communicate with the M2M server 108. In the power-saving mode, the M2M devices 102A-102C may periodically activate their receivers for a brief time period to listen to information from the communication network 106. Thus, the M2M devices 102A-102C consume less power in the power-saving mode than in the active mode.

For certain delay-tolerant M2M applications and in order to reduce subscription fees, M2M devices 102A-102C may be allowed to send or receive data during only a specific time interval, according to a service subscription agreement with the communication network 106. Outside the allowed time interval, the M2M devices may still send or receive data but with higher subscription fees. Thus, outside the allowed time interval, 102A-102C are configured to operate in the power-saving mode. Additionally, parameters of the active mode and the power-saving mode, including the starting time of the active mode and the length of the power-saving mode, may be adjusted for individual M2M devices 102A-102C according to information received from the communication network 106.

In addition, the M2M devices 102A-102C may form a network 110, which operates in accordance with, for example, the IEEE 802.11 standard, the IEEE 802.15.4 standard, or the LTE standard. The network 110 is referred to herein as a capillary network. The M2M devices 102A-102C within the network 110 may communicate directly or indirectly with the M2M gateway 104 through their respective networking interfaces, such as a wireless modem, a Wi-Fi interface, a Bluetooth interface, a Zigbee interface, a radio-frequency identification (RFID) interface, an LTE-based proximity communication interface, etc. Thus, the networking interfaces of the M2M devices 102A-102C may support communications based on one or more communication standards, such as the IEEE 802.11 standard, the IEEE 802.15.4 standard, or the LTE standard. Further details of the M2M devices 102 will be described below.

The M2M gateway 104 is configured to couple the M2M devices 102A-102C to the communication network 106. The M2M gateway 104 may include one or more of the following components: a memory configured to store data, information, and computer program instructions, a processor configured to execute the computer program instructions to perform various processes and methods disclosed herein, input and output modules, network interfaces, antennas, etc.

According to an additional embodiment, the M2M gateway 104 may itself be an M2M device having similar functions and capabilities as those of the M2M devices 102A-102C and also include additional capabilities to support the gateway functions. In other words, the M2M gateway 104 may operate as a regular M2M device within the capillary network 110 for monitoring and sending data to the M2M server, as well as provide gateway-related functions between the capillary network 110 and the communication network 106. According to a further embodiment, the M2M gateway 104 is not predetermined, and may be selected, when desired, among the M2M devices within the capillary network 110. Accordingly, any M2M device with gateway-related capabilities within the capillary network 110 may operate as the M2M gateway 104. Further details of the M2M gateway 104 will be described below.

The communication network 106 may be a wireless communication network operated by a service provider in accordance with one or more communication standards. For illustrative purposes, it is assumed that the communication network 106 operates in accordance with the LTE standard specifically and the 3GPP standards more generally. For example, the communication network 106 includes at least one base station (BS) 112, also known as an eNodeB. When the M2M gateway 104 is located within a coverage area of the base station 112, the base station 112 can communicate with the M2M gateway 104. In addition, the base station 112 can also communicate directly with individual M2M devices 102A-102C located within the coverage area of the base station 112.

In exemplary embodiments, the network 106 may also include a serving gateway (SOW) 114, a mobility management entity (MME) 116, and a home subscriber server (HSS) 118. The SOW 114, the MME 116, and the HSS 118 may be implemented on one or more computer systems known in the art and operate in according with the above standards. In particular, the SGW 114 is configured to route and forward user data to and from the capillary network 110, while also acting as a mobility anchor for network communications during inter-eNodeB handovers or inter-network transfers. For an M2M device in the power-saving mode, the SGW 114 terminates a downlink data path and triggers paging when downlink data arrives for the M2M device. The SGW 114 also manages and stores, for examples, parameters of an IP bearer service and network internal routing information for the M2M devices.

The MME 116 is configured to track and page the M2M devices operating in the power-saving mode. The MME 116 is also configured to choose an SGW for an M2M device during an initial attach procedure and during an intra-network handover. The MME 116 is also configured to authenticate the M2M devices, generate and allocate temporary identities to the M2M devices, and enforce roaming restrictions on the M2M devices. According to one embodiment, the MME 116 generates a result of monitoring network traffic conditions of the communication network 106. The MME 116 may obtain information regarding the network traffic conditions from other network components, such as the SGW 114.

The HSS 118 is a central database that contains user-related and subscription-related information associated with the M2M devices 102A-102C within the capillary network 110. The HSS 118 provides functionalities including, for example, user authentication and access authorization. The subscription-related information stored by the HSS 118 includes, for example, an allowed time duration for the M2M devices 102A-102C, during which they are allowed to send and/or receive data, according to the service subscription agreement discussed above. The allowed time duration for the M2M devices are indicated by a starting time of the allowed time duration and a length of the allowed time duration.

The M2M server 108 is configured to communicate with the communication network 106. For example, the M2M server 108 may receive data from the M2M devices 102A-102C through the M2M gateway 104 and the communication network 106. Also for example, the M2M server 108 may send control or configuration information to the M2M devices 102A-102C through the M2M gateway 104 and/or the communication network 106. Alternatively, the M2M server 108 may send the control or configuration information to the M2M devices 102A-102C directly or through other means as known in the art.

Figure 2A:
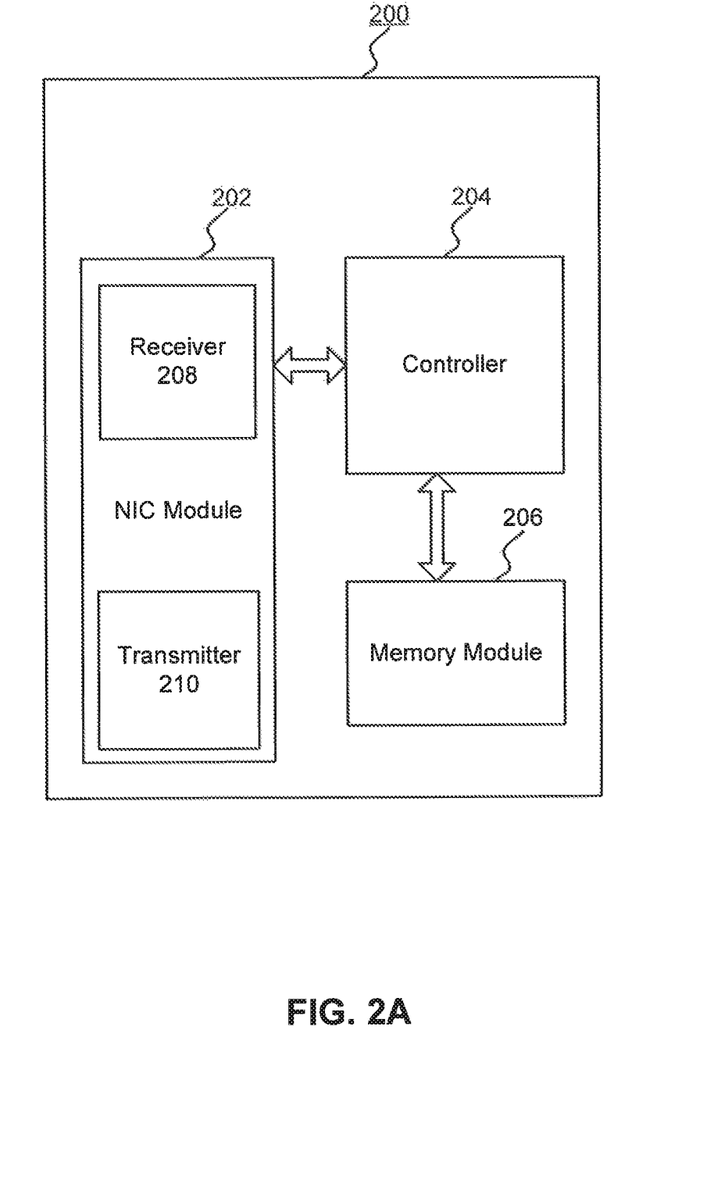
FIG. 2A illustrates a block diagram of an M2M device, according to an exemplary embodiment.

FIG. 2A illustrates a block diagram of an M2M device 200 generally corresponding to any one of the M2M devices 102A-102C, shown in FIG. 1, according to an exemplary embodiment. The M2M device 200 includes, at least, a network interface controller (NIC) module 202 for receiving and transmitting data, a controller 204 for executing program codes to process the data and to control the M2M device 200, and a memory module 206 for storing the data and the program codes.

In exemplary embodiments, the NIC module 202 is configured to communicate, directly or indirectly, with the M2M gateway 104 using one or more network interfaces, such as a Wi-Fi interface, a Bluetooth interface, a Zigbee interface, an RFID interface, or an LTE-based proximity communication interface. The NIC module 202 may provide periodic or non-periodic communications between the M2M device 200 and the M2M gateway 104. For example, the NIC module 202 may periodically transmit data, such as information on temperature, pressure, etc., to the M2M gateway 104. In an additional embodiment, the NIC module 202 includes a receiver 208 for receiving data from the M2M gateway 104 and a transmitter 210 for transmitting data to the M2M gateway 104. In an alternative embodiment, the receiver 208 and the transmitter 210 of the MC module 202 are configured to communicate with the base station 112 directly and operate according to the LTE or the 3GPP standards.

The controller 204 of the M2M device 200 may be a microprocessor or a central processing unit (CPU), as known in the art. The controller 204 exchanges data with the NIC module 202 and the memory module 206. In addition, the controller 204 retrieves program codes from the memory module 206 and executes the program codes to process the data received from the MC module 202 and the memory module 206. The controller 204 also causes the M2M device 200 to carry out processes described herein in accordance with the program codes.

The memory module 206 of the M2M device 200 stores the data and program codes for controlling the M2M device. The memory module 206 may include one or ore of a RAM, a ROM, a flash memory, and/or other computer-readable media as known in the art.

In exemplary embodiments, the controller 204, by executing the program codes stored in the memory module 206, switches the M2M device 200 between the power-saving mode and the active mode, in order to reduce power consumption while providing necessary communications with the M2M server 108. For example, when the NIC module 202 transmits data to the M2M gateway 104, the controller 204 causes the M2M device 200 to operate in the active mode, in which power consumption is relatively high. When the NIC module 202 does not transmit or receive data via the M2M gateway 104, on the other hand, the controller 204 causes the M2M device 200 to operate in the power-saving mode.

In exemplary embodiments, the controller 202 causes the M2M device 200 to switch, periodically or non-periodically, between the power-saving mode and the active mode. The timing of the switching between the two modes and the length of the modes may be adjusted in accordance with parameters stored within the M2M device and information received from the communication network 106.

According to an alternative embodiment, the NIC module 202 supports a proximity communication protocol that allows the M2M device 200 to communicate, through wired or wireless channels, with another M2M device at an adjacent location. The proximity communication protocol may operate in accordance with the technical specification of 3GPP TR 22.803 published on Mar. 15, 2013, which is hereby incorporated by reference in its entirety. In this embodiment, the M2M device 200 communicates with the adjacent M2M device through a direct path established therebetween or a communication path established via the M2M gateway 104 or the base station 112.

Figure 2B:
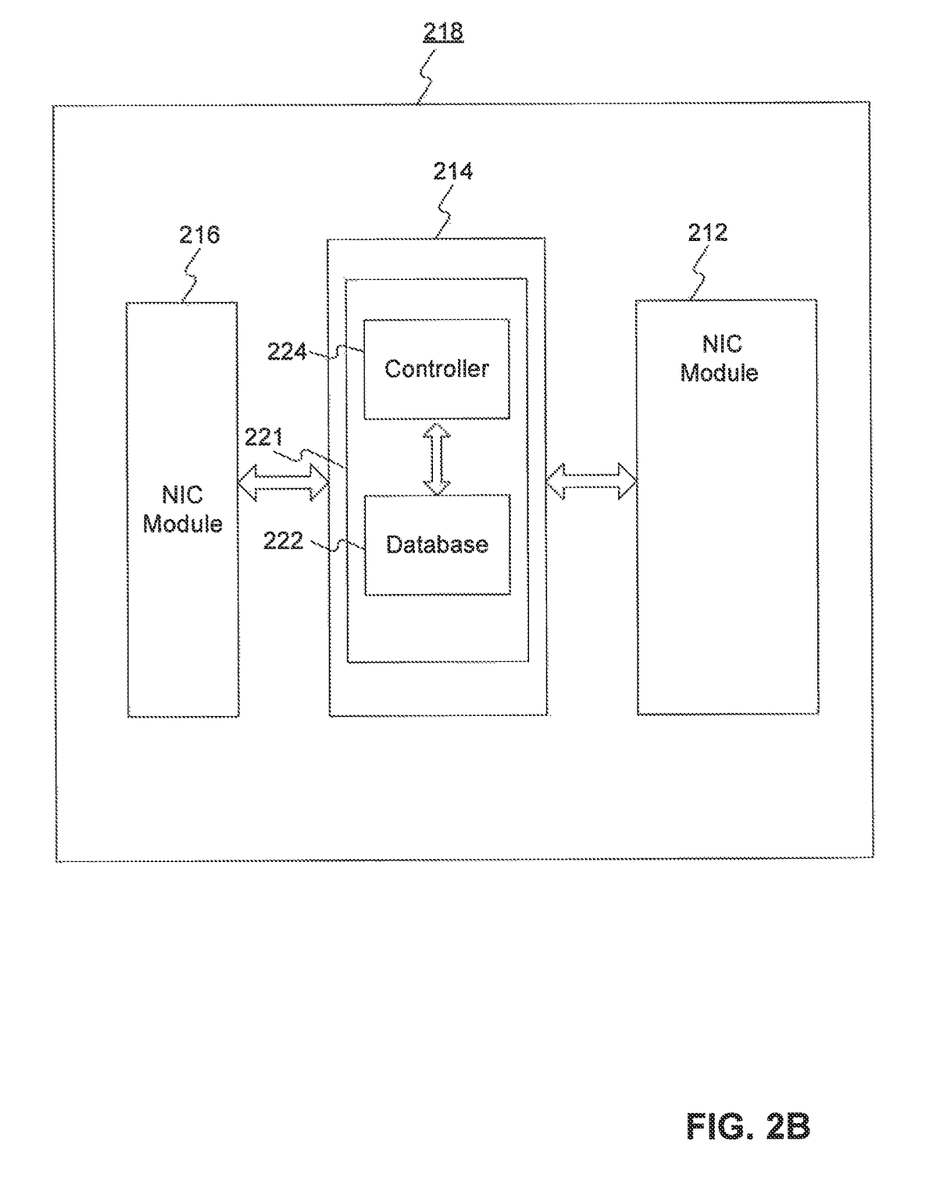
FIG. 2B illustrates a block diagram of an M2M gateway, according to an exemplary embodiment.

FIG. 2B illustrates a block diagram of an M2M gateway 218, generally corresponding to the M2M gateway 104 shown in FIG. 1, according to an exemplary embodiment. The M2M gateway 218 includes a first network interface controller (NIC) module 216 for communicating with the M2M devices 102A-102C, a second NIC module 212 for communicating with the communication network 106, and a core module 214 coupled to the NIC module 216 and the NIC module 212. Each of the NIC module 216, the NIC module 212, and the core module 214 may be implemented by one or more processors and a non-transitory computer-readable medium. In exemplary embodiments, the first NIC module 216 is configured to communicate with the M2M devices 102 using one or more interfaces, such as a Wi-Fi interface, a Bluetooth interface, a Zigbee interface, an RFID interface, or an LTE-based proximity communication interface.

In exemplary embodiments, the MC module 212 includes a standard LTE or 3GPP protocol stack for communicating with the communication network 106. The NIC module 212 may receive from the communication network 106, periodically or non-periodically, the service subscription information for the M2M devices within the capillary network 110. The service subscription information includes, for example, information on the allowed time duration allocated to the M2M devices 102A-102C, during which they are configured to operate in the active mode to send or receive data. This information may indicate a starting time for the allowed time duration determined according, for example, to the traffic condition of the communication network 106.

The NIC module 212 is also configured to send initial information regarding the M2M devices 102A-102C to the communication network 106 based on, e.g., an initial attach process provided in the LTE or 3GPP standard. Additionally, the NIC module 212 may send, periodically or non-periodically, updated information regarding the M2M devices 102 to the communication network 106 based on a Tracking Area Update (TAU) process according to the LTE or the 3GPP standard.

In exemplary embodiments, the core module 214 includes, among other things, an M2M controller unit 221 which further includes a database 222 and a controller 224. The controller unit 221 stores information regarding the M2M devices 102A-102C in the database 222 and retrieves the information therefrom. The information regarding the M2M devices includes, for example, the starting time and a length of the allowed time duration allocated to the M2M devices to be in the active mode by the communication network 106.

Based on the information stored in the database 222, the controller unit 221 may further determine parameters for the active mode and the power-saving mode of each individual M2M device within the capillary network 110. For example, the controller unit 221 determines a starting time for setting a particular M2M device to the active mode and a duration of the active mode, which is also referred to as a communication window for the M2M device. The starting time and the communication window of the active mode for each M2M device are determined based on the starting time and the length of the allowed time duration and the number of M2M devices within the network 110. According to an additional embodiment, the controller unit 221 also determines a duration of the power-saving mode for each M2M device. The controller unit 221 may further store the parameters for the active mode and the power-saving mode of the M2M devices 102A-102C in the database 222 and transmit the parameters to the M2M devices through the NIC module 216.

According to a further embodiment, the M2M gateway 218 itself also switches, periodically or non-periodically, between a power-saving mode and an active mode according to the parameters set therein. The M2M gateway 218 determines the parameters for the active mode and the power-saving mode based on the allowed time duration allocated by the communication network 106 as described above. Thus, the M2M gateway 218 may provide functions similar to those M2M devices 102A-102C.

Figure 3:
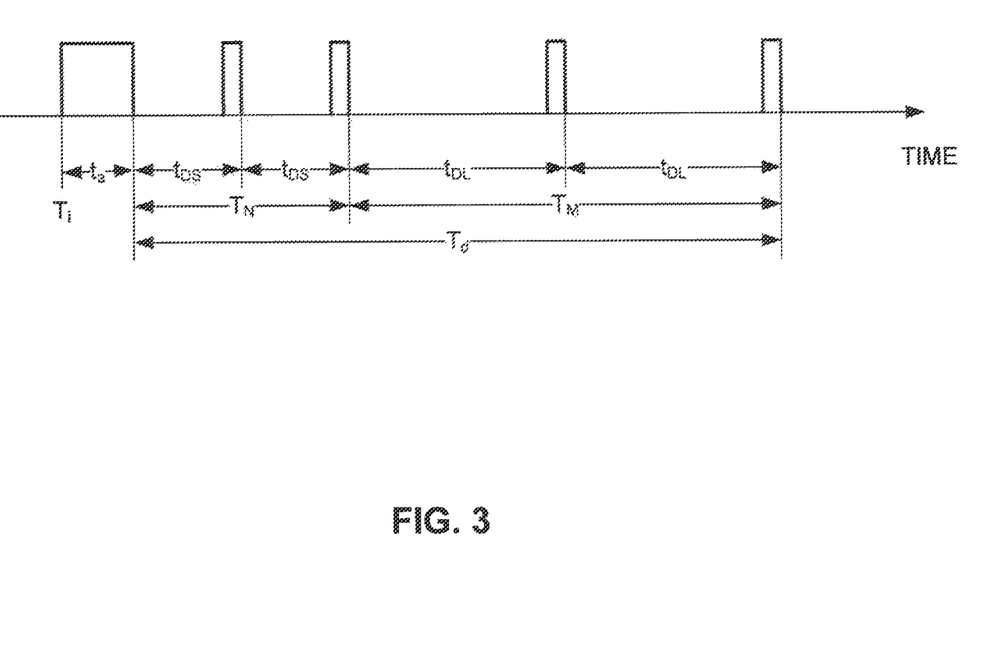
FIG. 3 illustrates a timing diagram for controlling an M2M device, according to an exemplary embodiment.

FIG. 3 depicts a timing diagram of an individual M2M device, which generally corresponds to one of the M2M devices 102A-102C or the M2M gateway 104 operating in the capillary network 110. As shown in FIG. 3, the M2M device operates in the active mode during a time period $t_a$ and in the power-saving mode during a time period $T_d$. The time period $t_a$ is the communication window, during which the receiver 208 and the transmitter 210 of the MC module 202 are both activated. As a result, in the active mode, the M2M device is configured to communicate with the M2M server 108 through the communication network 106.

At the end of the communication window $t_a$, the M2M device is switched to the power-saving mode and operates in the power-saving mode for a period $T_d$. In the power-saving mode, the receiver 208 and the transmitter 210 in the MC module 202 are deactivated in order to reduce energy consumption. As a result, the M2M device terminates the communication with the M2M server 108.

In an additional embodiment, the M2M device operating in the power-saving mode may periodically activate the receiver for a short time period to listen to status-related information, such as a paging signal, from the communication network 106. More specifically, the M2M device initially follows a short discontinuous reception (DRX) cycle in the power-saving mode and periodically activates the receiver every $t_{DS}$ time interval. The total time duration for the M2M device to operate in the short DRX cycle is $T_N$.

If no information is received by the end of the $T_N$ period, the M2M device transits to a long discontinuous reception (DRX) cycle and periodically activates the receiver every $t_{DL}$ time interval. Because the $t_{DL}$ time interval is generally greater than the $t_{DS}$ time interval, the receiver of the NIC module 202 is activated less frequently in the long DRX cycle. Thus, the energy consumption by the M2M device is further reduced in the long DRX cycle. The total time duration for the M2M device to operate in the long DRX cycle is $T_M$. As a result, the total time duration $T_d$ of the power-saving mode is substantially a sum of the $T_N$ interval and the $T_A$ interval.

According to a further embodiment, the communication window $t_a$ for the M2M device is determined according to a service subscription between the M2M device and the communication network 106. For example, the service subscription may specify that the M2M device is allowed to use the network service of the network 106 once an hour, a day, a week, or a month.

According to a further embodiment, the starting time $T_i$ of the active mode for an individual M2M device is determined based, for example, on a traffic condition of the communication network 106. Specifically, when the result of monitoring the traffic condition indicates that the traffic condition of the communication network 106 varies, the communication network 106 may cause the starting time $T_i$ of the communication window $t_a$ to be adjusted to a time of relatively light traffic. As a result, network resources are used more efficiently.

According to a still further embodiment, the number of short DRX cycles and the number of long DRX cycles are adjusted to further reduce the power consumption of the M2M device. For example, the number of short DRX cycles is reduced, while the number of long DRX cycles is increased. Accordingly, the $T_N$ time interval is reduced, and the $T_M$ time interval is increased. As a result, the M2M device operates in the long DRX cycle for a relatively greater time period, thereby consuming less power.

Figure 4A:
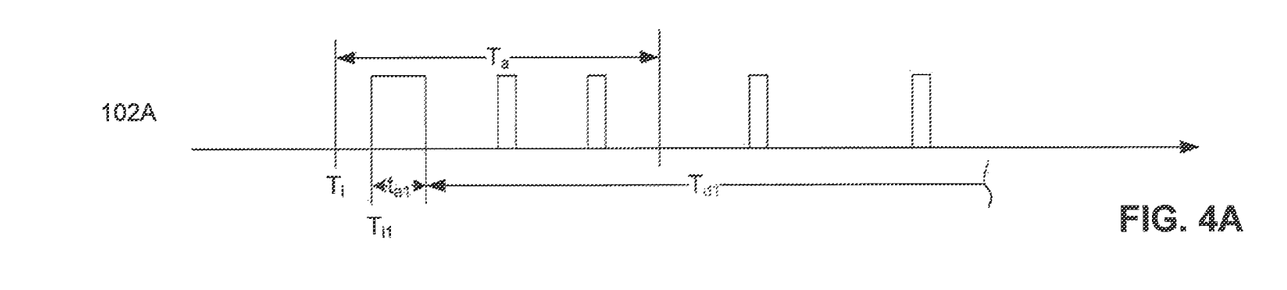
FIGS. 4A-4C illustrate timing diagrams for controlling a group of M2M devices, according to an exemplary embodiment.
Figure 4B:
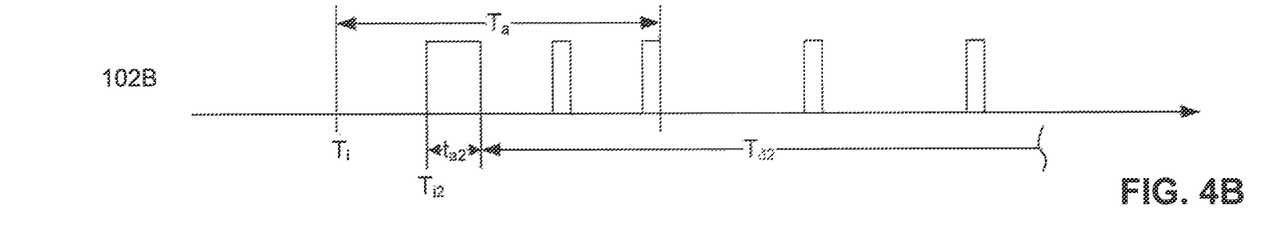
Figure 4C:
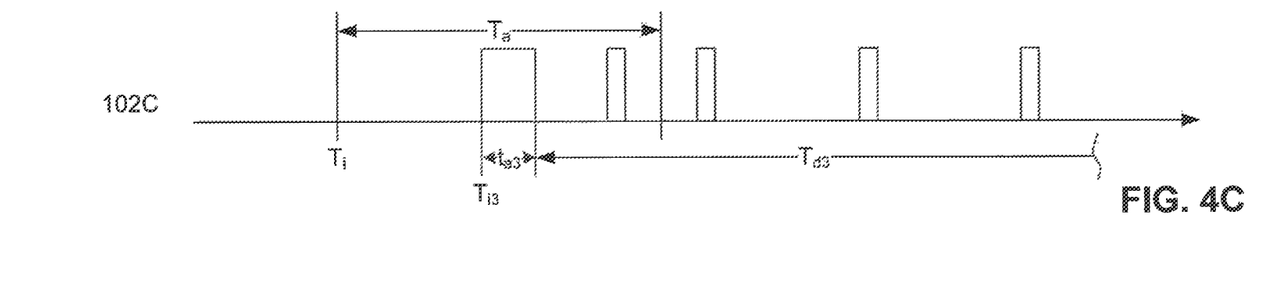

FIGS. 4A-4C illustrate timing diagrams of a group of M2M devices, such as the M2M devices 102A-102C of FIG. 1, operating in a capillary network, such as the capillary network 110. The group of M2M devices communicates with the M2M server 108 through the communication network 106 according to a group-based service subscription. The group-based service subscription specifies, for example, an allowed time duration $T_a$, in which the group of M2M devices is allowed to transmit and receive data through the network 106. Outside the allowed time duration $T_a$, the group of M2M devices is not allowed to communicate with the M2M server 108 through the network 106.

The allowed time duration $T_a$ may occur every hour, every day, every week, every month, etc. A starting time $T_i$ of the allowed duration $T_a$ for the group of M2M devices is adjustable according to the network traffic condition of the network 106. For example, the starting time $T_i$ may be adjusted so that the allowed duration occurs when the traffic of the network 106 is relatively light. As a result, resources are utilized more efficiently.

Within the allowed time duration $T_a$, each M2M device of the group is allocated a communication window, which is a portion of the allowed time duration $T_a$, to transmit and receive data through the network 106. For example, a communication window $t_{a1}$ starting at time $T_{i1}$ is allocated to the M2M device 102A, as shown in FIG. 4A. Accordingly, the M2M device 102A operates in the active mode within the communication window $t_{a1}$ and communicates with the M2M server 108 through the network 106.

Outside the communication window $t_{a1}$, the M2M device 102A enters into the power-saving mode for a duration of $T_{d1}$, according to the process depicted in FIG. 3 above. In particular, the M2M device 102A may first enter a short DRX cycle, in which the receiver 208 of the NIC module 202 of the M2M device 102A is activated periodically for a short period of time to listen to status-related information from the network 106. As a result, the M2M device 102A consumes less power in the short DRX cycle than in the active mode.

If no data is received for a predetermined time period within the short DRX cycle, the M2M device 102A enters a long DRX cycle, in which the receiver 208 of the NIC module 202 of the M2M device 102A is activated less frequently, while the transmitter 210 of the NIC module 202 remains deactivated. As a result, the M2M device 102A consumes even less power in the long DRX cycle than in the short DRX cycle.

Similarly, communication windows $t_{a2}$ and $t_{a3}$ within the allowed time duration $T_a$ are allocated to the M2M devices 102B and 102C, respectively, as shown in FIGS. 4B and 4C. The M2M devices 102B and 102C are allowed to communicate with the M2M server 108 within the respective communication windows starting at times $T_{i2}$ and $T_{i3}$, respectively. Outside the respective communication windows, the M2M devices 102B and 102C enter into the power-saving mode for time periods of $T_{d2}$ and $T_{d3}$, respectively, and operate according to the short DRX cycle and the long DRX cycle as described above.

The communications windows $t_{a1}$, $t_{a2}$, and $t_{a3}$ may or may not overlap one another. They may be determined by the M2M gateway 104 or the communication network 106 based on one or more parameters including, for example, the length of the allowed time duration $T_a$, the starting time $T_i$ of the allowed time duration, and the number of the M2M devices within the group.

Alternatively, the communications windows $t_{a1}$, $t_{a2}$, and $t_{a3}$ are determined by one of the M2M devices of the capillary network 110. After the communication windows for individual M2M devices are determined, each M2M device in the capillary network is notified of the information by the network entity that makes the determination, e.g., by the M2M gateway 104, the communication network 106, a base station, an eNodeB, or one of the M2M devices. The information regarding the communication windows is transmitted to individual M2M devices according to, for example, a multicast protocol, a point-to-point communication protocol, or an LTE-based proximity communication protocol. It will be understood that, when the capillary network 110 includes only a single M2M device, the allowed time duration $T_a$ shown in FIGS. 4A-4C is equal to the allowed time duration $t_a$ shown in FIG. 3, which is equal to the communication window for the single M2M device.

According to another embodiment, in deployment scenarios where the M2M devices 102A-102C do not have the LTE-based proximity communication interface, the M2M devices 102A-102C communicate with the M2M server 108 via the M2M gateway 104 using their WiFi, ZigBee, Bluetooth, or other similar interfaces. In this embodiment, the M2M devices 102A-102C may be configured to operate in a continuous sleep or power-saving duration of $T_d$ without the short DRX cycle or the long DRC cycle. Accordingly, the duration of $T_d$ is defined as a sleeping cycle.

Figure 5:
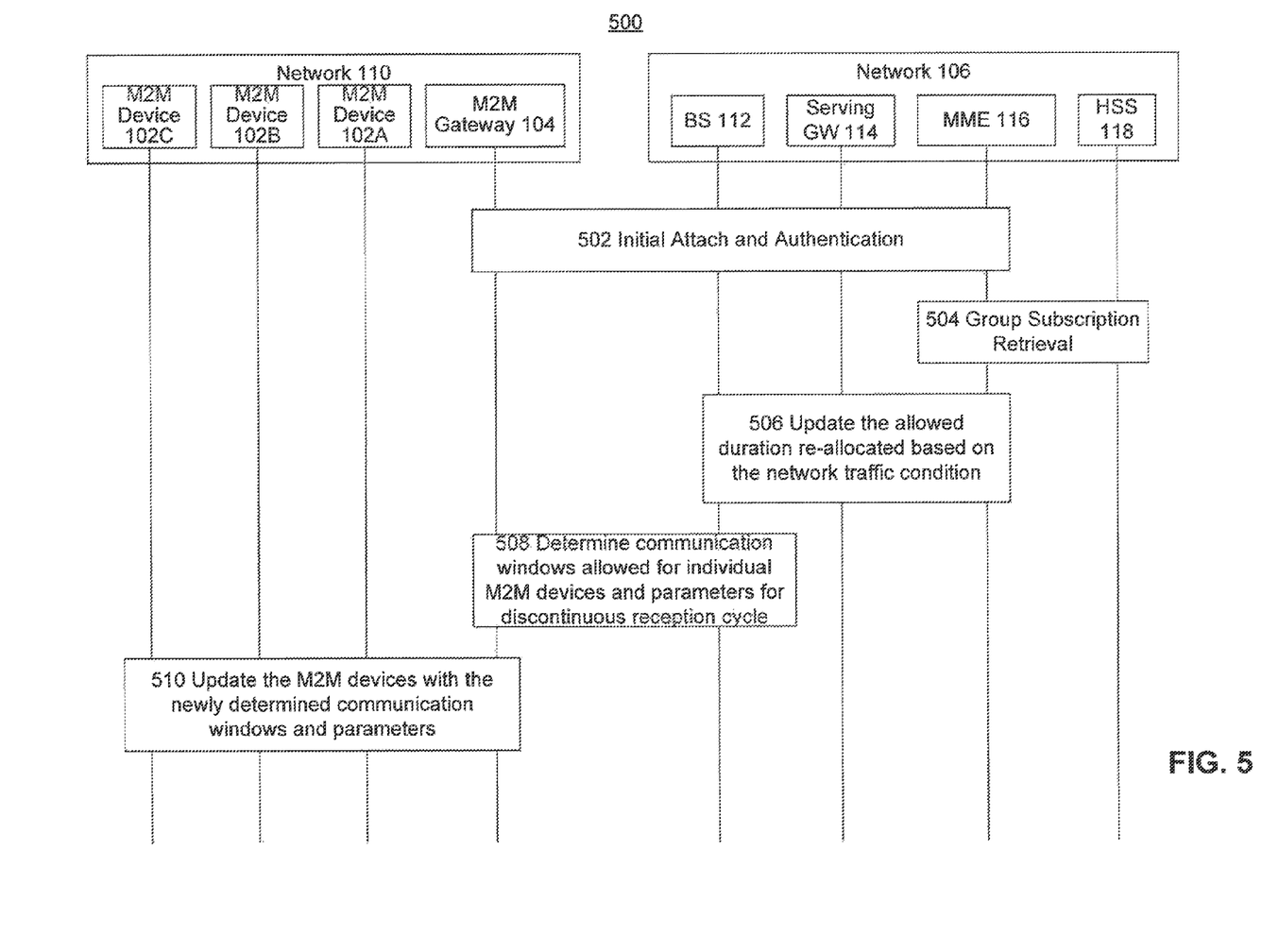
FIG. 5 illustrates a process for controlling a group of M2M devices, according to an exemplary embodiment.

FIG. 5 illustrates a process 500 for operating a group of one or more M2M devices 102A-102C within the capillary network 110. The M2M devices 102A-102C communicate with the M2M server 108 (shown in FIG. 1) through the M2M gateway 104 and the communication network 106. The M2M gateway 104 may be one of the M2M devices within the capillary network 110, which has gateway capabilities. Accordingly, in addition to the gateway functions, the M2M gateway 104 may provide functions similar to the M2M devices 102X-102C. Thus, the M2M devices 102A-102C and the M2M gateway 104 may form a group of M2M devices. The M2M devices within the capillary network 110 are capable of operating in an active mode and a power-saving mode. The communication network 106 includes the base station 112, the serving gateway (GW) 114, the MME 116, and the HSS 118 as described above in connection with FIG. 1.

According to the process 500, at step 502, the M2M gateway 104 and the network 106 execute an initial attach and authentication process. The initial attach and authentication process includes, for example, transmitting an attach request from the M2M gateway 104 to the base station 112. This attach request includes information indicating, for example, power saving preferences of devices, gateway capabilities, and other details related to group-based or individual subscriptions. Upon receiving the attach request, the base station 112 executes an initial attach process with the MME 116.

At step 504, the MME 116 retrieves group-based or individual service subscription data from the HSS 118 for the group of M2M devices. The service subscription data indicates, for example, an allowed time duration allocated to the group of M2M devices for using the network service of the network 106.

At step 506, the MME 116 determines a starting time $T_i$ of the allowed time duration $T_a$ for the group of M2M devices based on the subscription data as well as a traffic condition of the network 106. The MME 116 determines the allowed time duration $T_a$ for the group of M2M devices and adjusts the starting time $T_i$ to a time of relatively light traffic in network 106. The MME 116 then forwards information indicating the allowed time duration $T_a$ and the starting time $T_i$ to the base station 112. Alternatively, the MME 116 may forward information directly to the M2M gateway 104 regarding allowed time duration $T_a$ and the starting time $T_i$.

At step 508, the base station 112 transmits the information indicating the allowed duration $t_a$ and the starting time $T_i$ to the M2M gateway 104. The M2M gateway 104 then determines the parameters for the active mode of individual M2M devices within the group. Specifically, the M2M gateway 104 determines the length of the communication window and the starting time of the communication window for each M2M device based on the length of the allowed time duration $t_a$, the starting time $T_u$ of the allowed time duration $T_a$, and the number of M2M devices within the group.

Additionally, the M2M gateway 104 also determines parameters for the power-saving mode for each M2M device based on the allowed duration $T_a$ and the starting time $T_i$. In particular, for an individual M2M device, the M2M gateway 104 determines the total duration for the power-saving mode, which may be the entire time period outside the corresponding communication window. If M2M devices 102A-102C are equipped with the LTE-based communication interface, the M2M gateway 104 also determines the number of short DRX cycles and the number of long DRX cycles for each M2M device.

In general, an M2M device consumes less power when operating in the long DRX cycle than in the short DRX cycle and the active mode, because the receiver of the MC module is activated relatively less frequently. On the other hand, there is a relatively greater possibility for the M2M device operating the long DRX cycle to miss information transmitted from the network 106 because the receiver 208 of the NIC module 202 is deactivated for a greater time interval. As a result, in determining the number of the short DRX cycles and the number of the long DRX cycles, the M2M gateway 104 balances the power consumption and the possibility of missing data. This balance may be achieved according to requirements specified by a user or a specific application of the system 100.

In an alternative embodiment, the base station 112 determines the parameters for the active mode and the power-saving mode for each M2M device. In this embodiment, the base station 112 transmits the parameters to the M2M gateway 104 at step 508.

At step 510, individual M2M devices are updated with the parameters for the active mode and the power-saving mode, including their respective communication windows, the starting times, and the parameters of the power-saving mode newly determined at step 508. For example, the M2M gateway 104 may transmit the information indicative of the communication windows, the starting times, and the parameters of the power-saving mode to individual M2M devices within the capillary network 110. The M2M devices 102A-102C then operate according to the newly received information.

The information may be transmitted from the M2M gateway 104 to the M2M devices and propagated throughout the capillary network 110 according to a multicast protocol, an LTE-based proximity transmission protocol, or a local-communication protocol without involving the base station 112. The transmission of the information may be through the proximity communication interface, the Wi-Fi interface, the Bluetooth interface, the Zigbee interface, the RFID interface, or other suitable networking interfaces of the M2M devices. Since the information is transmitted among the M2M devices without involving the base station 112, the transmission of the information does not further burden the base station 112 and the communication network 106.

According to some further embodiments, steps 504, 506, 508, and 510 are carried out periodically to dynamically configure the parameters for the active mode and the power-saving mode of the M2M devices. In one embodiment, the M2M gateway 104 periodically initiates a request to the communication network 106 for re-allocation of the allowed time duration $T_a$ by the network 106. Upon receiving the request, the communication network 106 carries out step 504 to retrieve the group subscription data and step 506 to determine the re-allocated time duration $T_a$ based on the group subscription data and the traffic condition, as described above. Based on the newly determined allowed time duration $T_a$, the M2M gateway 104 or the base station 112 performs step 508 to determine the parameters for the active mode and the power-saving mode for individual M2M devices. The M2M devices are then updated with the newly determined parameters at step 510.

In an alternative embodiment, the communication network 106 initiates the process to dynamically update the allowed time duration $T_a$ for the group of M2M devices in the capillary network 110. For example, a network component of the communication network 106, such as the base station 112, the serving gateway 114, or the MME 116, monitors the traffic condition of the communication network 106. When the result of monitoring indicates that the traffic condition changes, the monitoring network component determines that the change in the traffic condition requires a re-allocation of the allowed time duration $T_a$ for the group of M2M devices. The network component sends a request to the MME 116 to initiate the re-allocation of the allowed time duration $T_a$. Upon receiving the request, the network 106 carries out steps 504 and 506 to determine the re-allocated allowed time duration $T_a$ based on the subscription data and the newly determined traffic condition. Based on the newly determined allowed time duration $T_a$, the M2M gateway 104 or the base station 112 determines the parameters for the active mode and the power-saving mode for individual M2M devices at step 508. The M2M devices are then updated with the newly determined parameters at step 510.

According to a further embodiment, information indicating the allowed time duration transmitted from the network 106 to the M2M gateway may be carried in an Evolved Packet System Mobility Management (EMM) message defined in 3GPP TS 24.301 (LTE), "Non-Access-Stratum (NAS) protocol for Evolved Packet System (EPS)," V8.1.0, March 2009, which is hereby incorporated by reference. According to another embodiment, the parameters for the active mode and the power-saving mode transmitted to individual M2M devices 102A-102C within the capillary network 110 may be carried in a Wi-Fi data frame, such as the Vendor Specific frame, defined in the known Wi-Fi standard.

Other embodiments of the invention will be apparent to those skilled in the art from consideration of the specification and practice of the embodiments disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for operating machine-to-machine devices in a network, comprising:
   monitoring a traffic condition of a communication network;
   determining, based on a result of monitoring the traffic condition, an allowed time duration for a group of machine-to-machine devices to communicate with a machine-to-machine server through the communication network; and
   transmitting information indicating the allowed time duration to a machine-to-machine gateway for operating the machine-to-machine devices according to the allowed time duration, the machine-to-machine devices communicating with the communication network through the machine-to-machine gateway.

2. The method of claim 1, wherein the determining of the allowed time duration further comprises determining a starting time of the allowed time duration.

3. The method of claim 1, further comprising:
   retrieving group-based or individual subscription data for the machine-to-machine devices; and
   determining the allowed time duration based, in addition, on the subscription data.

4. The method of claim 1, wherein the transmitting of the information indicating the allowed time duration to the machine-to-machine gateway further comprises including the information indicating the allowed time duration in an LTE EMM message.

5. The method of claim 1, further comprising:
   receiving a request, from one of the machine-to-machine devices or a base station, for a re-allocation of the allowed time duration; and
   re-allocating the allowed time duration in response to the request.

6. The method of claim 1, further comprising:
   determining a change in the traffic condition of the communication network based on the monitoring of the traffic condition; and
   determining the allowed time duration in response to the change.

7. A system for operating machine-to-machine devices in a network, comprising:
   a first processor configured to monitor a traffic condition of a communication network and determining, based on a result of monitoring the traffic condition, an allowed time duration for a group of machine-to-machine devices to communicate with a machine-to-machine server through the communication network; and
   a second processor configured to transmit information indicating the allowed time duration to a machine-to-machine gateway for operating the machine-to-machine devices according to the allowed duration, the machine-to-machine devices communicating with the communication network through the machine-to-machine gateway.

8. The system of claim 7, wherein the first processor is further configured to determine a starting time of the allowed time duration.

9. The system of claim 7, wherein the first processor is further configured to:
   retrieve group-based or individual subscription data for the machine-to-machine devices; and
   determine the allowed time duration based, in addition, on the subscription data.

10. The system of claim 7, wherein the second processor is further configured to transmit the information indicating the allowed time duration and a starting time in an LTE EMM message.

11. The system of claim 7, wherein the first processor and the second processor operate in accordance with a 3GPP standard.

12. The system of claim 7, wherein the first processor is further configured to:
    receive a request for an re-allocation of the allowed time duration; and
    re-allocate the allowed time duration in response to the request.

13. The system of claim 7, wherein the first processor is further configured to:
    determine a change in the traffic condition of the communication network based on the monitoring result; and
    determine the allowed time duration in response to the change.

14. A method for operating machine-to-machine devices in a network, comprising:
    receiving an LTE EMM message carrying information indicating an allowed time duration for a group of machine-to-machine devices to communicate with a machine-to-machine server through a communication network;
    determining communication windows for the machine-to-machine devices, respectively, based on the allowed time duration; and
    transmitting data indicating the respective communication windows to the respective machine-to-machine devices for operating the machine-to-machine devices according to the respective communication windows.

15. The method of claim 14, the determining of the respective communication windows further comprising determining starting times of the respective communication windows.

16. The method of claim 14, further comprising determining the respective communication windows based, in addition, on the number of the machine-to-machine devices.

17. The method of claim 14, wherein the LTE EMM message further carries information indicating a starting time.

18. The method of claim 14, further comprising transmitting the data indicating the respective communication windows to the respective machine-to-machine devices through one of a Wi-Fi interface, a Zigbee interface, a Bluetooth interface, an RFID interface, or an LTE-based proximity communication interface.

19. The method of claim 14, further comprising transmitting a request for the allowed time duration to the communication network.

20. The method of claim 14, further comprising determining parameters of a power-saving mode of the machine-to-machine devices, the parameters indicating at least one of a total duration of the power saving mode, a number of short discontinuous reception cycles, or a number of long discontinuous reception cycles.

21. An apparatus for operating machine-to-machine devices in a network, comprising:
   a first interface module configured to receive an LTE EMM message carrying information indicating an allowed time duration for a group of machine-to-machine devices to communicate with a machine-to-machine server through a communication network;
   a controller configured to determine communication windows for the individual machine-to-machine devices based on the allowed time duration; and
   a second interface module configured to transmit data indicating the communication windows to the machine-to-machine devices for operating the machine-to-machine devices according to the respective communication windows.

22. The apparatus of claim 21, wherein the controller is further configured to determine starting times of the communication windows.

23. The apparatus of claim 21, wherein the controller is further configured to determine the communication windows based, in addition, on the number of the machine-to-machine devices.

24. The apparatus of claim 21, wherein the LTE EMM message further carries information indicating a starting time.

25. The apparatus of claim 21, wherein the second interface module further comprises one of a Wi-Fi interface, a Zigbee interface, a Bluetooth interface, an RFID interface, or an LTE-based proximity communication interface configured to transmit the data indicating the communication windows to the machine-to-machine devices.

26. A non-transitory computer-readable medium including instructions, which, when executed by a processor, cause the processor to perform a method for operating machine-to-machine devices in a network, the method comprising:
   receiving an LTE EMM message carrying information indicating an allowed time duration for a group of machine-to-machine devices to communicate with a machine-to-machine server through a communication network;
   determining communication windows for the respective machine-to-machine devices based on the allowed time duration; and
   transmitting data indicating the respective communication windows to the respective machine-to-machine devices for operating the machine-to-machine devices according to the respective communication windows.

27. A method for operating a machine-to-machine device, the method comprising:
   receiving information indicating an allowed time duration for a group of machine-to-machine devices to communicate with a machine-to-machine server through a communication network, the machine-to-machine devices capable of operating in an active mode and a power-saving mode;
   determining, by the machine-to-machine gateway, parameters for the active mode and the power-saving mode for at least one of the machine-to-machine devices, the at least one of the machine-to-machine devices communicating with the communication network through the machine-to-machine gateway; and
   transmitting data for operating the at least one machine-to-machine device of the group of machine-to-machine devices according to the parameters.

28. The method of claim 27, wherein the parameters for the active mode include a starting time of a communication window, the starting time of the communication window indicating a starting time of the active mode.

29. The method of claim 27, wherein the parameters for the power-saving mode include a time period of the power-saving mode.

30. The method of claim 29, wherein the parameters for the power-saving mode further indicate a number of short discontinuous reception cycles and a number of long discontinuous reception cycles of the at least one machine-to-machine device.

31. A method for operating a machine-to-machine device, the method comprising:
   receiving parameters of an active mode and a power-saving mode of a machine-to-machine device, the parameters being determined by a machine-to-machine gateway; and
   switching the machine-to-machine device between the active mode and the power-saving mode according to the parameters, the machine-to-machine device, when operating in the active mode, communicating with a machine-to-machine server through a communication network via the machine-to-machine gateway.

32. The method of claim 31, further comprising receiving the parameters through a Wi-Fi interface, a Bluetooth interface, a Zigbee interface, an RFD interface, or a proximity communication interface.

33. The method of claim 32, further comprising receiving the parameters from at least one of the machine-to-machine gateway or the communication network.

34. The method of claim 31, wherein the parameters of the power saving mode indicate at least one of a sleeping cycle, a number of short discontinuous reception cycles, or a number of long discontinuous reception cycles, and
   the method further comprises:
      operating the machine-to-machine device for the number of short discontinuous reception cycles; and
      operating the machine-to-machine device for the number of long discontinuous reception cycles following the short discontinuous reception cycles.

35. An apparatus comprising:
   a receiver and a transmitter, the receiver being configured to receive parameters of an active mode and a power-saving mode of the apparatus, the parameters being determined by a machine-to-machine gateway; and
   a controller configured to switch the apparatus between the active mode and the power-saving mode according to the parameters and activate the receiver and the transmitter in the active mode to communicate with a machine-to-machine server through a communication network via the machine-to-machine gateway.

36. The apparatus of claim 35, wherein the receiver and the transmitter include at least one of a Wi-Fi interface, a Bluetooth interface a Zigbee interface, an RFID interface, or a proximity communication interface.

37. The apparatus of claim 35, wherein the controller is further configured to:
   deactivate the transmitter and the receiver in the power-saving mode; and
   periodically activate the receiver in the power-saving mode according to the parameters of the power-saving mode.

38. The apparatus of claim 37, wherein the parameters of the power saving mode indicate at least one of a sleeping cycle, a number of short discontinuous reception cycles, or a number of long discontinuous reception cycles, and
   the controller is further configured to:
      operate the apparatus for the number of short discontinuous reception cycles; and operate the apparatus for the number of long discontinuous reception cycles following the short discontinuous reception cycles.

39. A non-transitory computer-readable medium including instructions, which, when executed by a processor, cause the processor to perform a method for operating a machine-to-machine device, the method comprising:
receiving parameters of an active mode and a power-saving mode of a machine-to-machine device, the parameters being determined by a machine-to-machine gateway; and
switching the machine-to-machine device between the active mode and the power-saving mode according to the parameters, the machine-to-machine device, when operating in the active mode, communicating with a machine-to-machine server through a communication network via the machine-to-machine gateway.

* * * * *